(12) United States Patent
Carlier et al.

(10) Patent No.: US 11,993,513 B2
(45) Date of Patent: May 28, 2024

(54) PROCESS FOR MANUFACTURING AN AQUEOUS HYDROGEN PEROXIDE SOLUTION

(71) Applicant: SOLVAY SA, Brussels (BE)

(72) Inventors: Juan-Teva Carlier, Sombreffe (BE); Pierre Dournel, Brussels (BE); Karol Lorent, Strépy-Bracquegnies (BE)

(73) Assignee: Solvay SA, Brussels (BE)

( * ) Notice: Subject to any disclaimer, the term of this patent is extended or adjusted under 35 U.S.C. 154(b) by 884 days.

(21) Appl. No.: 16/981,366

(22) PCT Filed: Mar. 19, 2019

(86) PCT No.: PCT/EP2019/056761
§ 371 (c)(1),
(2) Date: Sep. 16, 2020

(87) PCT Pub. No.: WO2019/179973
PCT Pub. Date: Sep. 26, 2019

(65) Prior Publication Data
US 2021/0047182 A1   Feb. 18, 2021

(30) Foreign Application Priority Data
Mar. 19, 2018 (EP) ..................... 18162441

(51) Int. Cl.
C01B 15/023   (2006.01)

(52) U.S. Cl.
CPC .................. C01B 15/023 (2013.01)

(58) Field of Classification Search
CPC .................................. C01B 15/023
See application file for complete search history.

(56) References Cited

U.S. PATENT DOCUMENTS

| | | | |
|---|---|---|---|
| 3,767,778 A | 10/1973 | Gunter et al. | |
| 4,349,526 A | 9/1982 | Goor et al. | |
| 4,394,369 A | 7/1983 | Ranbom | |
| 4,803,063 A | 2/1989 | Pralus | |
| 5,302,367 A | 4/1994 | Signorini et al. | |
| 5,605,670 A * | 2/1997 | Turunen | C01B 15/013 423/584 |
| 6,224,845 B1 | 5/2001 | Pennetreau et al. | |
| 2008/0317662 A1 | 12/2008 | Doherty | |

FOREIGN PATENT DOCUMENTS

| | | |
|---|---|---|
| BE | 1012987 A6 | 7/2001 |
| CN | 105152924 A | 12/2015 |
| DE | 2018686 A1 | 10/1971 |
| EP | 286610 A2 | 10/1988 |
| EP | 0326455 A1 | 8/1989 |
| EP | 529723 A1 | 8/1992 |
| EP | 965562 A1 | 12/1999 |
| EP | 3052439 A1 | 8/2016 |
| GB | 841323 A | 7/1960 |
| GB | 1032252 A | 6/1966 |
| GB | 1244470 A | 9/1971 |
| IN | 02479DE1995 A | 9/2013 |
| JP | 2004099541 A1 | 4/2004 |
| JP | 2006001298 * | 4/2008 |
| WO | 2010139728 A1 | 12/2010 |
| WO | 2012041918 * | 4/2012 |
| WO | 2015049327 A1 | 4/2015 |

OTHER PUBLICATIONS

Gupta, et al. "Hydrogen-Bonding and Protonation Effects in Electrochemistry of Quinones in Aprotic Solvents". J. Am. Chem. Soc. 119, 6384-6391 (1997). (Year: 1997).*
Shive et al., Trans-2,2,6-Trimethylcyclohexanecarboxylic Acid: a Second Solid Naphthenic Acid from California Petroleum, JACS, 1942, vol. 64, pp. 385-389.
Dischino et al., Synthesis of H-labeled 2-hydroxy-N-[(1,3,3-trimethyl-[4,5,6-H]cyclohexyl)methyl]-5-azidobenzamide, a Photoaffinity Analog of an Influenza Fusion Inhibitor, Journal of Labbelled Compounds and Radiopharm, 1999, vol. 42, pp. 965-974.

* cited by examiner

*Primary Examiner* — Sheng H Davis
(74) *Attorney, Agent, or Firm* — Osha Bergman Watanabe & Burton LLP

(57) ABSTRACT

Process for manufacturing an aqueous hydrogen peroxide solution comprising the following steps: —hydrogenating a working solution which comprises an alkylanthraquinone and/or tetrahydroalkylanthraquinone and a mixture of a non-polar organic solvent and a polar organic solvent wherein the concentration of non-polar organic solvent in said mixture is equal to or higher than 30 wt %; —oxidizing the hydrogenated working solution to produce hydrogen peroxide; and—isolating the hydrogen peroxide, wherein the polar organic solvent is a substituted cyclohexane carbonitrile.

19 Claims, 1 Drawing Sheet

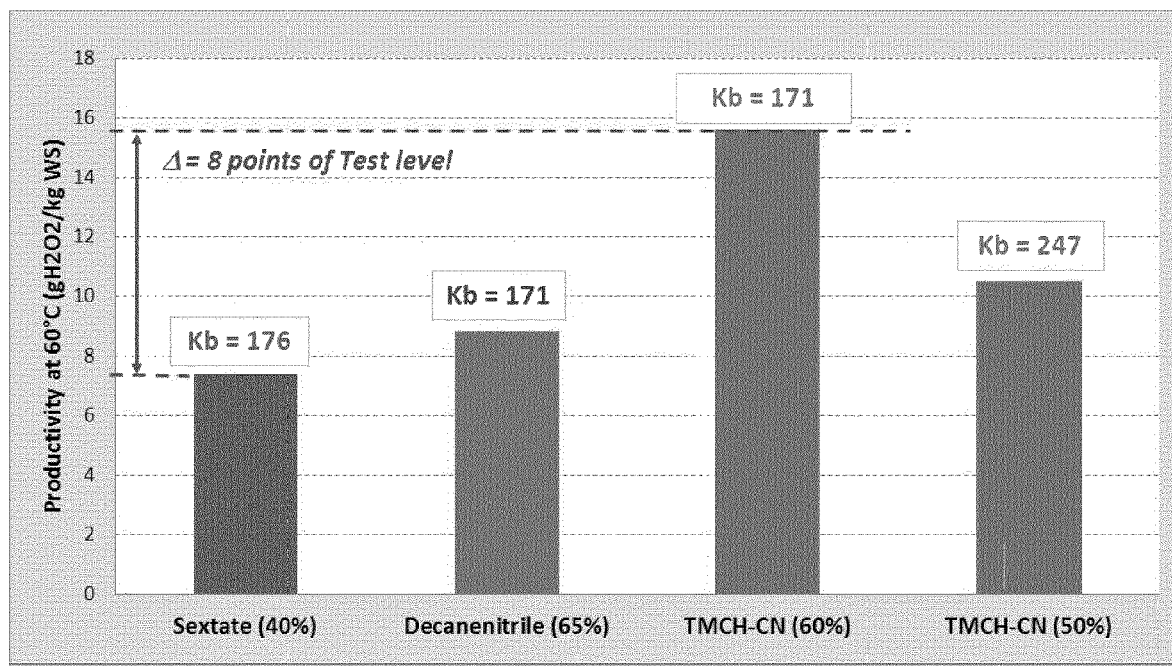

PROCESS FOR MANUFACTURING AN AQUEOUS HYDROGEN PEROXIDE SOLUTION

This application is a U.S. national stage entry under 35 U.S.C. X371 of International Application No. PCT/EP2019/056761 filed Mar. 19, 2019, which claims priority to European application No. EP18162441.2 filed on Mar. 19, 2018, the whole content of U.S. provisional application No. 62/637,362, filed Mar. 1, 2018. The entire contents of these applications being incorporated herein by reference for all purposes.

The present invention relates to a process for manufacturing an aqueous hydrogen peroxide solution.

Hydrogen peroxide is one of the most important inorganic chemicals to be produced worldwide. Its industrial applications include textile, pulp and paper bleaching, organic synthesis (propylene oxide), the manufacture of inorganic chemicals and detergents, environmental and other applications.

Synthesis of hydrogen peroxide is predominantly achieved by using the Riedl-Pfleiderer process (originally disclosed in U.S. Pat. Nos. 2,158,525 and 2,215,883), also called anthraquinone loop process or AO (auto-oxidation) process.

This well-known cyclic process makes use typically of the auto-oxidation of at least one alkylanthrahydroquinone and/or of at least one tetrahydroalkylanthrahydroquinone, most often 2-alkylanthraquinone, to the corresponding alkylanthraquinone and/or tetrahydroalkylanthraquinone, which results in the production of hydrogen peroxide.

The first step of the AO process is the reduction in an organic solvent (generally a mixture of solvents) of the chosen quinone (alkylanthraquinone or tetrahydroalkylanthraquinone) into the corresponding hydroquinone (alkylanthrahydroquinone or tetrahydroalkylanthrahydroquinone) using hydrogen gas and a catalyst. The mixture of organic solvents, hydroquinone and quinone species (working solution, WS) is then separated from the catalyst and the hydroquinone is oxidized using oxygen, air or oxygen-enriched air thus regenerating the quinone with simultaneous formation of hydrogen peroxide. The organic solvent of choice is typically a mixture of two types of solvents, one being a good solvent of the quinone derivative (generally a non-polar solvent for instance a mixture of aromatic compounds) and the other being a good solvent of the hydroquinone derivative (generally a polar solvent for instance a long chain alcohol or an ester). Hydrogen peroxide is then typically extracted with water and recovered in the form of a crude aqueous hydrogen peroxide solution, and the quinone is returned to the hydrogenator to complete the loop.

The use of di-isobutyl-carbinol (DIBC) as polar solvent is namely described in Patent applications EP 529723, EP 965562 and EP 3052439 in the name of the Applicant. The use of a commercial mixture of aromatics sold under the brand Solvesso®-150 (CAS no. 64742-94-5) as non-polar solvent is also described in said patent applications. This mixture of aromatics is also known as Caromax, Shellsol, A150, Hydrosol, Indusol, Solvantar, Solvarex and others, depending on the supplier. It can advantageously be used in combination with sextate (methyl cyclohexyl acetate) as polar solvent (see namely U.S. Pat. No. 3,617,219).

Most of the AO processes use either amylanthraquinone (AQ), 2-butylanthraquinone (BQ) or 2-ethyl anthraquinone (EQ). Especially in the case of EQ, the productivity of the working solution is limited by the lack of solubility of the reduced form of ETQ (ETQH). It is namely so that EQ is largely and relatively quickly transformed in ETQ (the corresponding tetrahydroalkylanthraquinone) in the process. Practically, that ETQ is hydrogenated in ETQH to provide H2O2 after oxidation. The quantity of EQH produced is marginal in regards of ETQH. It means that the productivity of the process is directly proportional to the amount of ETQH produced. The reasoning is the same for a process working with AQ or BQ instead of EQ.

The hydrogenated quinone solubility issue is known from prior art and some attempts were made to solve it, for instance in JP 2004099541 which relates to a process for making an epoxy compound from an olefin and hydrogen peroxide according to which said hydrogen peroxide is first generated in two successive steps of hydrogenation and oxidation of EQ, and which teaches to use pure benzonitrile as solvent. Paragraphs 58 to 60 of this document relate to comparative examples with other solvents (toluene, xylene and 2-methylnaphthalene) which show to be much less effective for the EQH. The problem is that benzonitrile is a solvent having a density very close to that of water and it is also rather water soluble. Therefore, to promote the extraction of hydrogen peroxide from the working solution, NaCl is added to the water of extraction and the final hydrogen peroxide solution hence contains NaCl and is therefore very aggressive as a corrosion agent. Besides, the process described in this document is a single pass production of hydrogen peroxide and not a continuous loop process. Such practices are only economically suitable for laboratory trials and/or to provide a hydrogen peroxide solution for immediate consumption and not for the industrial production of hydrogen peroxide.

Besides, the advantage of a mixture of solvents as currently used in the industrial AO processes and which mainly is to bring enough solubility of oxidized quinones in solution, cannot be reached with the single benzonitrile solvent. Additionally, it is worth noting that non polar aromatic solvents like the above mentioned Solvesso are generally cheap to that the use of a mixture of solvents as the additional advantage of being economical.

The Applicant has now found out that by using as polar solvent in the mixture, a non-aromatic cyclic nitrile type solvent, it is possible to increase the solubility of the reduced (hydrogenanted) quinone forms and therefore the productivity of AO plants, especially those using EQ. Cyclohexane carbonitriles, and especially substituted ones (in which the nitrile function is protected from chemical degradation), were found to be particularly suitable for the application since they allow increasing the solubility of the ETQH species while maintaining acceptable process working conditions.

The present invention therefore concerns a process for manufacturing an aqueous hydrogen peroxide solution comprising the following steps:
hydrogenating a working solution which comprises an alkylanthraquinone and/or tetrahydroalkylanthraquinone and a mixture of a non-polar organic solvent and a polar organic solvent wherein the concentration of non-polar organic solvent in said mixture is equal to or higher than 30 wt %;
oxidizing the hydrogenated working solution to produce hydrogen peroxide; and
isolating the hydrogen peroxide,
wherein the polar organic solvent is a substituted cyclohexane carbonitrile In the process of the invention, which preferably is a continuous process operated in loop, a working solution is used which is hence preferably circulated in a loop through the hydrogenation, oxidation and purification steps.

The term "alkylanthraquinone" is intended to denote a 9,10-anthraquinone substituted in position 1, 2 or 3 with at least one alkyl side chain of linear or branched aliphatic type comprising at least one carbon atom. Usually, these alkyl chains comprise less than 9 carbon atoms and, preferably, less than 6 carbon atoms. Examples of such alkylanthraquinones are ethylanthraquinones like 2-ethylanthraquinone (EQ), 2-isopropylanthraquinone, 2-sec- and 2-tert-butylanthraquinone (BQ), 1,3-, 2,3-, 1,4- and 2,7-dimethylanthraquinone, amylanthraquinones (AQ) like 2-iso- and 2-tert-amylanthraquinone and mixtures of these quinones.

The term "tetrahydroalkylanthraquinone" is intended to denote the 9,10-tetrahydroquinones corresponding to the 9,10-alkylanthraquinones specified above. Hence, for EQ and AQ, they respectively are designated by ETQ and ATQ, their reduced forms (tetrahydroalkylanthrahydroquinones) being respectively ETQH and ATQH.

Preferably, an AQ or EQ is used, the latter being preferred.

As explained above, the main feature of the invention is the recourse to a mixture of a polar organic solvent and a non-polar organic solvent wherein the polar organic solvent is a substituted cyclohexane carbonitrile. Unsubstituted cyclohexane carbonitrile was not found to be suitable because the nitrile function is not protected so that the molecule undergoes degradation during the AO process. The substituent(s) are preferably alkyl groups, preferably methyl and/or ethyl group(s). The basic cyclohexane carbonitrile structure is preferably methylated, preferably with at least 2 methyl groups (and hence, has at least 9 carbon atoms in total) in order to protect the nitrile and most preferably with at least 3 and more preferably with at least 4 methyl groups to get 10 or 11 carbons in total in the molecule. Another alternative would be to use at least one propyl, diethyl, methyl isopropyl, butyl, t-butyle . . . the latter being preferred.

The substituent group(s) attached to the hydrocarbon cycle preferably is close to the nitrile function in order to protect it, typically in position 1, 2 and/or 6.

A suitable C9 substituted cyclohexane carbonitrile available commercially is 3,5-dimethylcyclohexane-1-carbonitrile.

C10 substituted cyclohexane carbonitrile molecules that have been synthesized in the past are 2,2,6-trimethyl-cyclohexane-carbonitrile and 1,3,3-trimethyl-cyclohexane-carbonitrile.

The former (2,2,6-trimethyl-cyclohexane-carbonitrile) was synthesized by Shive et al. (JACS, 1942, vol. 64, pp. 385-389) starting from the corresponding acid (2,2,6-trimethyl-cyclohexane-carboxylic acid), which was first transformed in the corresponding acyl chloride using thionyl chloride, then in the corresponding amide using ammonia and finally, in the corresponding carbonitrile by dehydration using phosphorus pentoxide. Hence, in a preferred embodiment, the substituted cyclohexane carbonitrile is 2,2,6-trimethylcyclohexane carbonitrile which has been synthesized as set forth above.

The latter (1,3,3-trimethyl-cyclohexane-carbonitrile) was synthesized by Dischino et al. (J. Labelled Cpd. Radiopharm. 42, 965-974, 1999) using a process comprising the following steps:
  reacting diethylaluminum cyanide with isophorone;
  reducing the ketone group with sodium borohydride to give a mixture of diastereomers of 3-cyano-3,5,5-trimethylcyclohexanol;
  reacting this mixture with methanesulfonyl chloride;
  eliminating methanesulfonic and leaving a mixture of the cyano-olefins;
  hydrogenating the resulting olefins over 10% Pd/C in methanol.

Good results were obtained with 2,2,6-trimethyl-cyclohexane-carbonitrile (hereafter abbreviated as TMCH-CN).

In one embodiment, the substituted cyclohexane carbonitrile has been synthesized in a 2 step reaction comprising first reacting a conjugated diene with a dienophile bearing a nitrile group in order to obtain a substituted cyclohexene carbonitrile and second hydrogenating the double bound of the substituted cyclohexene carbonitrile, wherein at least one of the conjugated diene or the dienophile is substituted preferably by at least one methyl group.

The first reaction step (which is a Diels-Alder reaction) is preferably catalysed by Lewis acids such as ZnCl2, BF3, BCl3, SnCl4, AlCl3, TiCl4, TiCl2-isopropoxide and rare earth derivatives like ytterbium trichloride, triflate or triflamide. Although Diels-Alder reactions may occur simply by thermal activation, Lewis acid catalysis enables them to proceed at low temperatures, i.e. without thermal activation.

The second reaction step (hydrogenation) is preferably catalysed by insoluble metals such as palladium in the form Pd—C, platinum in the form PtO2, and nickel in the form Ra—Ni.

Some preferred conjugated dienes, dienophiles and their reaction product are summarized in Table 2 attached.

In order to be able to also solubilize the quinone, the polarity of the solvent mixture should not be too high. Hence, there should be at least 30 wt % of non-polar solvent in the organic solvents mixture, and more preferably at least 40 wt %. Generally, there is not more than 80 wt % of this non-polar solvent, preferably not more than 60 wt % of it in the organic solvents mixture.

The non-polar solvent preferably is an aromatic solvent or a mixture of aromatic solvents. Aromatic solvents are for instance selected from benzene, toluene, xylene, tert-butylbenzene, trimethylbenzene, tetramethylbenzene, naphthalene, methylnaphthalene mixtures of polyalkylated benzenes, and mixtures thereof. The commercially available aromatic hydrocarbon solvent of type 150 from the Solvesso® series (or equivalent from other supplier) gives good results. S-150 (Solvesso®-150; CAS no. 64742-94-5) is known as an aromatic solvent of high aromatics which offer high solvency and controlled evaporation characteristics that make them excellent for use in many industrial applications and in particular as process fluids. The Solvesso® aromatic hydro-carbons are available in three boiling ranges with varying volatility, e.g. with a distillation range of 165-181° C., of 182-207° C. or 232-295° C. They may be obtained also naphthalene reduced or as ultra-low naphthalene grades. Solvesso® 150 (S-150) is characterized as follows: distillation range of 182-207° C.; flash point of 64° C.; aromatic content of greater than 99% by wt; aniline point of 15° C.; density of 0.900 at 15° C.; and an evaporation rate (nButAc=100) of 5.3.

As explained above, the hydrogenation reaction takes place in the presence of a catalyst (like for instance the one object of WO 2015/049327 in the name of the Applicant) and as for instance described in WO 2010/139728 also in the name of the applicant (the content of both references being incorporated by reference in the present application). Typically, the hydrogenation is conducted at a temperature of at least 45° C. and preferably up to 120° C., more preferably up to 95° C. or even up to 80° C. only. Also typically, the hydrogenation is conducted at a pressure of from 0.2 to 5 bar. Hydrogen is typically fed into the vessel at a rate of from 650 to 750 normal m3 per ton of hydrogen peroxide to be produced.

The oxidation step may take place in a conventional manner as known for the AO-process. Typical oxidation reactors known for the anthraquinone cyclic process can be used for the oxidation. Bubble reactors, through which the oxygen-containing gas and the working solution are passed co-currently or counter-currently, are frequently used. The bubble reactors can be free from internal devices or preferably contain internal devices in the form of packing or sieve plates. Oxidation can be performed at a temperature in the range from 30 to 70° C., particularly at 40 to 60° C. Oxidation is normally performed with an excess of oxygen, so that preferably over 90%, particularly over 95%, of the alkyl anthrahydroquinones contained in the working solution in hydroquinone form are converted to the quinone form.

After the oxidation, during the purification step, the hydrogen peroxide formed is separated from the working solution generally by means of an extraction step, for example using water, the hydrogen peroxide being recovered in the form of a crude aqueous hydrogen peroxide solution. The working solution leaving the extraction step is then recycled into the hydrogenation step in order to recommence the hydrogen peroxide production cycle, eventually after having been treated/regenerated.

In a preferred embodiment, after its extraction, the crude aqueous hydrogen peroxide solution is washed several times i.e. at least two times consecutively or even more times as required to reduce the content of impurities at a desired level.

The term "washing" is intended to denote any treatment, which is well known in the chemical industry (as disclosed in GB841323A, 1956 (Laporte), for instance), of a crude aqueous hydrogen peroxide solution with an organic solvent which is intended to reduce the content of impurities in the aqueous hydrogen peroxide solution. This washing can consist, for example, in extracting impurities in the crude aqueous hydrogen peroxide solution by means of an organic solvent in apparatuses such as centrifugal extractors or liquid/liquid extraction columns, for example, operating counter-current wise. Liquid/liquid extraction columns are preferred. Among the liquid/liquid extraction columns, columns with random or structured packing (like Pall rings for instance) or perforated plates are preferred. The former are especially preferred.

In a preferred embodiment, a chelating agent can be added to the washing solvent in order to reduce the content of given metals. For instance, an organophosphorus chelating agent can be added to the organic solvent as described in the above captioned patent application EP 3052439 in the name of the Applicant, the content of which is incorporated by reference in the present application.

The expression "crude aqueous hydrogen peroxide solution" is intended to denote the solutions obtained directly from a hydrogen peroxide synthesis step or from a hydrogen peroxide extraction step or from a storage unit. The crude aqueous hydrogen peroxide solution can have undergone one or more treatments to separate out impurities prior to the washing operation according to the process of the invention. It typically has an H2O2 concentration within the range of 30-50% by weight.

The following examples illustrate some preferred embodiments of the present invention.

EXAMPLES: SOLUBILITY TESTS OF HYDROGENATED QUINONES IN DIFFERENT SOLVENT MIXTURES

The determination of the QH solubility was performed on synthetic EQ/ETQ working solutions. These quinones mixed in the tested solvents have been hydrogenated to a fixed level and cooled down successively to 3 different temperatures before the measurement (min. 3 hours to stabilize the system between each measurement). The conditions applied for these tests were:

| | |
|---|---|
| EQ concentration | 100 g/kg |
| ETQ concentration | 140 g/kg |
| Polar solvent | variable (*) |
| Level of hydrogenation | 10.8Nl H2/kg WS (~116 g of QH/kg of WS) or a TL (Test Level) of 16.3 g of H2O2/kg of WS) |
| Temperature of hydrogenation | 75° C. |
| Temperatures of precipitation | 70, 65 and 60° C. |

(*) the polar solvents tested were sextate, decanenitrile and TMCH-CN.

They were used in mixture with S-150 in the ratios indicated in FIG. 1 attached, which also shows the results obtained. In this figure, Kb stands for the weight partition coefficient of hydrogen peroxide between the water and the working solution (mixture of quinones and organic solvents). It is calculated using the following formula:

$$Kb=(g\ H2O2/kg\ aqueous\ phase)/(g\ H2O2/kg\ organic\ phase)$$

FIG. 1 demonstrates the very high potential of cyclohexanecarbonitrile structures versus linear nitriles like decanenitrile.

The complete data are available in Table 1 attached.

The maximum solubility of a hydrogenated quinone (QH) in a solvent mixture is directly correlated with the productivity of the working solution. The higher is the QH solubility, the higher will be the theoretical quantity of hydrogen peroxide achievable per kg of WS (Productivity). These theoretical values, designated by the terms "Productivity (gH2O2/kg of WS) measured" in Table 1, were calculated as follows:

1 mole (240 g) ETQH (which actually is the QH in our Examples) per kg of WS will produce 1 mole (34 g) of H2O2 per kg of WS. Hence, the test level in our Examples equals: 34*QH/240.

Again, the values obtained with TMCH-CN are much higher (almost the double in fact) than with sextate or a linear nitrile like decanenitrile.

Should the disclosure of any patents, patent applications, and publications which are incorporated herein by reference conflict with the description of the present application to the extent that it may render a term unclear, the present description shall take precedence.

TABLE 1

| | | | Trials with synthetic quinones (EQ + ETQ) | | | |
|---|---|---|---|---|---|---|
| | | | Methylcyclohexylacetate | Decanenitrile | 2,2,6-trimethylcyclohexanecarbonitrile | |
| | | | Polar Solvent used | | | |
| | | | Sextate (40%) | Decanenitrile (65%) | TMCH-CN (60%) | TMCH-CN (50%) |
| Composition of working solution | EQ | g/kg | | 100 | | |
| | ETQ | g/kg | | 140 | | |
| | CUR dry residue | g/kg | | 0 | | |
| | Solvent mix | g/kg | | 760 | | |
| Mass ratio of polar solvent in solvent | | % | 40 | 35 | 60 | 50 |
| Mass ratio of S150 in solvent | | % | 60 | 65 | 40 | 50 |
| Kb of the solvents mix | | | 176 | 171 | 171 | 247 |
| Density of polar solvents at amb T° | | Kg/l | 0.94 | 0.83 | 0.89 | 0.89 |
| QH (g/kg) measured at . . . | | 60° C. | 52 | 62.2 | 110 | 73.9 |
| | | 65° C. | 60.8 | 71.5 | full soluble | 80.3 |
| | | 70° C. | 68 | 78.6 | full soluble | full soluble |
| Productivity (gH2O2/kg) measured at . . . | | 60° C. | 7.4 | 8.8 | 15.6 | 10.5 |
| | | 65° C. | 8.6 | 10.1 | full soluble (>17) | 11.4 |
| | | 70° C. | 9.6 | 11.1 | full soluble (>17) | full soluble (>17) |

TABLE 2

Dienophiles

Conjugated dienes: methacrylonitrile, crotononitrile, 2,3dimethylacrilonitrile, 3,3-dimethylacrylonitrile 1,3-pentadiene isoprene

The invention claimed is:

1. A process for manufacturing an aqueous hydrogen peroxide solution comprising the following steps:

hydrogenating a working solution which comprises an alkylanthraquinone and/or tetrahydroalkylanthraquinone and a mixture of a non-polar organic solvent and a polar organic solvent wherein the concentration of non-polar organic solvent in said mixture is equal to or higher than 30 wt %;

oxidizing the hydrogenated working solution to produce hydrogen peroxide; and isolating the hydrogen peroxide, wherein the polar organic solvent contains a substituted cyclohexane carbonitrile and, wherein at least one of the substituent group(s) of the cyclohexane carbonitrile is in position 1, 2, 3 and/or 6.

2. The process according to claim 1, wherein the process is a continuous process and wherein the working solution is circulated in a loop through the hydrogenation, oxidation and purification steps.

3. The process according to claim 1, wherein the alkylanthraquinone is chosen from the group consisting of ethylanthraquinones like 2-ethylanthraquinone (EQ), 2-isopropylanthraquinone, 2-sec- and 2-tert-butylanthraquinone (BQ), 1,3-, 2,3-, 1,4- and 2,7-dimethylanthraquinone, amylanthraquinones (AQ) like 2-iso- and 2-tert-amylanthraquinone and mixtures of these quinones.

4. The process according to claim 3, wherein the quinone is EQ, BQ or AQ.

5. The process according to claim 4, wherein the quinone is EQ.

6. The process according to claim 1, wherein the substituent(s) of the substituted cyclohexane carbonitrile are alkyl group(s).

7. The process according to claim 6, wherein the cyclohexane carbonitrile is substituted with at least 2 methyl groups.

8. The process according to claim 7, wherein the cyclohexane carbonitrile is substituted with at least 3 methyl groups.

9. The process according to claim 8, wherein the cyclohexane carbonitrile is substituted with at least 4 methyl groups.

10. The process according to claim 6, wherein the substituents of the substituted cyclohexane carbonitrile are methyl and/or ethyl group(s).

11. The process according to claim 1, wherein the substituted cyclohexane carbonitrile is 3,5-dimethylcyclohexane-1-carbonitrile.

12. The process according to claim 1, wherein the substituted cyclohexane carbonitrile is 2,2,6-trimethyl-cyclohexane-carbonitrile or 1,3,3-trimethyl-cyclohexane-carbonitrile.

13. The process according to claim 12, wherein the substituted cyclohexane carbonitrile is 1,3,3-trimethyl-cyclohexane-carbonitrile which has been synthesized by a process comprising the following steps:

reacting diethylaluminum cyanide with isophorone;

reducing the ketone group with sodium borohydride to give a mixture of diastereomers of 3-cyano-3,5,5-trimethylcyclohexanol;

reacting this mixture with methanesulfonyl chloride;

eliminating methanesulfonic and leaving a mixture of the cyano-olefins;

hydrogenating the resulting olefins over 10% Pd/C in methanol.

14. The process according to claim 1, wherein the substituted cyclohexane carbonitrile is 2,2,6-trimethyl-cyclohexane-carbonitrile which has been synthesized starting from the corresponding acid (2,2,6-trimethyl-cyclohexane-carboxylic acid), which was first transformed in the corresponding carboxylchloride using thionyl chloride, then in the corresponding amide using ammonia and finally, in the corresponding carbonitrile using phosphorus pentoxide.

15. The process according to claim 1, wherein the substituted cyclohexane carbonitrile has been synthesized in a 2 step reaction comprising first reacting a conjugated diene with a dienophile bearing a nitrile group in order to obtain a substituted cyclohexene carbonitrile and second hydrogenating the double bound of the substituted cyclohexene carbonitrile, wherein at least one of the conjugated diene or the dienophile is substituted.

16. The process according to claim 15, wherein the substituted cyclohexane carbonitrile has been synthesized in a 2 step reaction comprising first reacting a conjugated diene with a dienophile bearing a nitrile group in order to obtain a substituted cyclohexene carbonitrile and second hydrogenating the double bound of the substituted cyclohexene carbonitrile, wherein at least one of the conjugated diene or the dienophile is substituted by at least one methyl group.

17. The process according to claim 1, wherein there is not more than 80 wt % of non-polar organic solvent in the organic solvents mixture.

18. The process according to claim 17, wherein there is not more than 60 wt % of non-polar organic solvent in the organic solvents mixture.

19. The process according to claim 1, wherein the non-polar organic solvent is an aromatic solvent or a mixture of aromatic solvents.

* * * * *